United States Patent
Abe et al.

(10) Patent No.: US 11,661,012 B2
(45) Date of Patent: May 30, 2023

(54) TONNEAU COVER DEVICE (71) Applicant: Honda Motor Co., Ltd., Tokyo (JP)

(72) Inventors: Yoshihiro Abe, Tokyo (JP); Masakazu Hanano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 25 days.

(21) Appl. No.: 17/515,534

(22) Filed: Oct. 31, 2021

(65) Prior Publication Data
US 2022/0134852 A1   May 5, 2022

(30) Foreign Application Priority Data

Nov. 2, 2020   (JP) .............. JP2020-183731

(51) Int. Cl.
*B60R 5/04* (2006.01)
*B60J 7/14* (2006.01)

(52) U.S. Cl.
CPC .............. *B60R 5/044* (2013.01); *B60J 7/141* (2013.01)

(58) Field of Classification Search
CPC ....... B60J 7/14; B60J 7/141; B60J 7/16; B60J 7/1607; B60J 7/1621; B60R 5/044; B60R 5/045

USPC ........... 296/100.01, 100.06, 100.08, 136.03, 296/136.04

See application file for complete search history.

(56) References Cited

U.S. PATENT DOCUMENTS

| 4,479,675 A * | 10/1984 | Zankl | B60R 5/044 296/37.16 |
| 10,752,178 B2 * | 8/2020 | Loewe | B60R 5/044 |
| 2011/0057467 A1 * | 3/2011 | Umeda | B60R 5/045 296/37.8 |
| 2014/0015275 A1 * | 1/2014 | Miyazaki | B60R 5/047 296/136.03 |

FOREIGN PATENT DOCUMENTS

| DE | 102008036005 A1 * | 2/2010 | ............. B60R 5/045 |
| JP | 2000255322 A * | 9/2000 | ............. B60R 5/044 |
| JP | 2002036957 | 2/2002 | |

* cited by examiner

Primary Examiner — Jason S Daniels
(74) Attorney, Agent, or Firm — JCIPRNET (57) ABSTRACT

The invntion provides a tonneau cover device. The tonneau cover device includes a tonneau cover installed on the rear portion of the vehicle and a tonneau cover bracket attached to the rear end portion of the tonneau cover, and the tonneau cover bracket extends in the width direction of the vehicle. A columnar portion serving as a rotation axis of the tonneau cover and a handle portion arranged in front of the columnar portion in the front-rear direction of the vehicle and extending downward are included.

8 Claims, 6 Drawing Sheets

TONNEAU COVER DEVICE

CROSS-REFERENCE TO RELATED APPLICATION

This application claims the priority benefits of Japanese application no. 2020-183731, filed on Nov. 2, 2020. The entry of the above-mentioned patent application is incorporated by reference herein and made a part of the specification.

BACKGROUND

Technical Field

The disclosure relates to a tonneau cover device.

Description of Selected Art

Conventionally, there is a tonneau board that is mounted on the back door (tailgate) of a vehicle and can be rotated along an axis parallel to the axle (see, for example, Patent Literature 1). The rear portion of the tonneau board is attached to the tailgate by a hinge portion, and the front portion of the tonneau board is fixed to the tailgate at a position above the hinge portion by a cord.

CREATED ART

Patent Literature

[Patent Literature 1] Japanese Unexamined Patent Publication No. 2002-36957

In the above-mentioned conventional technique, when the tailgate is opened, the tonneau board may be stored in the tailgate by removing the cord from the tailgate. However, since the tonneau board cannot be removed from the vehicle, there are cases where the storage space cannot be effectively used, such as when storing goods in the luggage room (luggage compartment).

The disclosure has been made in consideration of such circumstances, and one of the objects of the disclosure is to provide a tonneau cover device capable of completely removing the tonneau cover from the vehicle body and mounting and dismounting the tonneau cover.

SUMMARY

The tonneau cover device according to the disclosure has the following configuration.

(1): According to one aspect of the disclosure, a tonneau cover device includes a tonneau cover installed on a rear portion of the vehicle and a tonneau cover bracket mounted on a rear end portion of the tonneau cover, in which the tonneau cover bracket includes a columnar portion extending in a vehicle width direction and serving as a rotation axis of the tonneau cover, and a handle portion arranged in front of the columnar portion and extending downward.

DESCRIPTION OF THE EMBODIMENTS

Hereinafter, embodiments of a tonneau cover device of the disclosure will be described with reference to the drawings.

Figure 1:
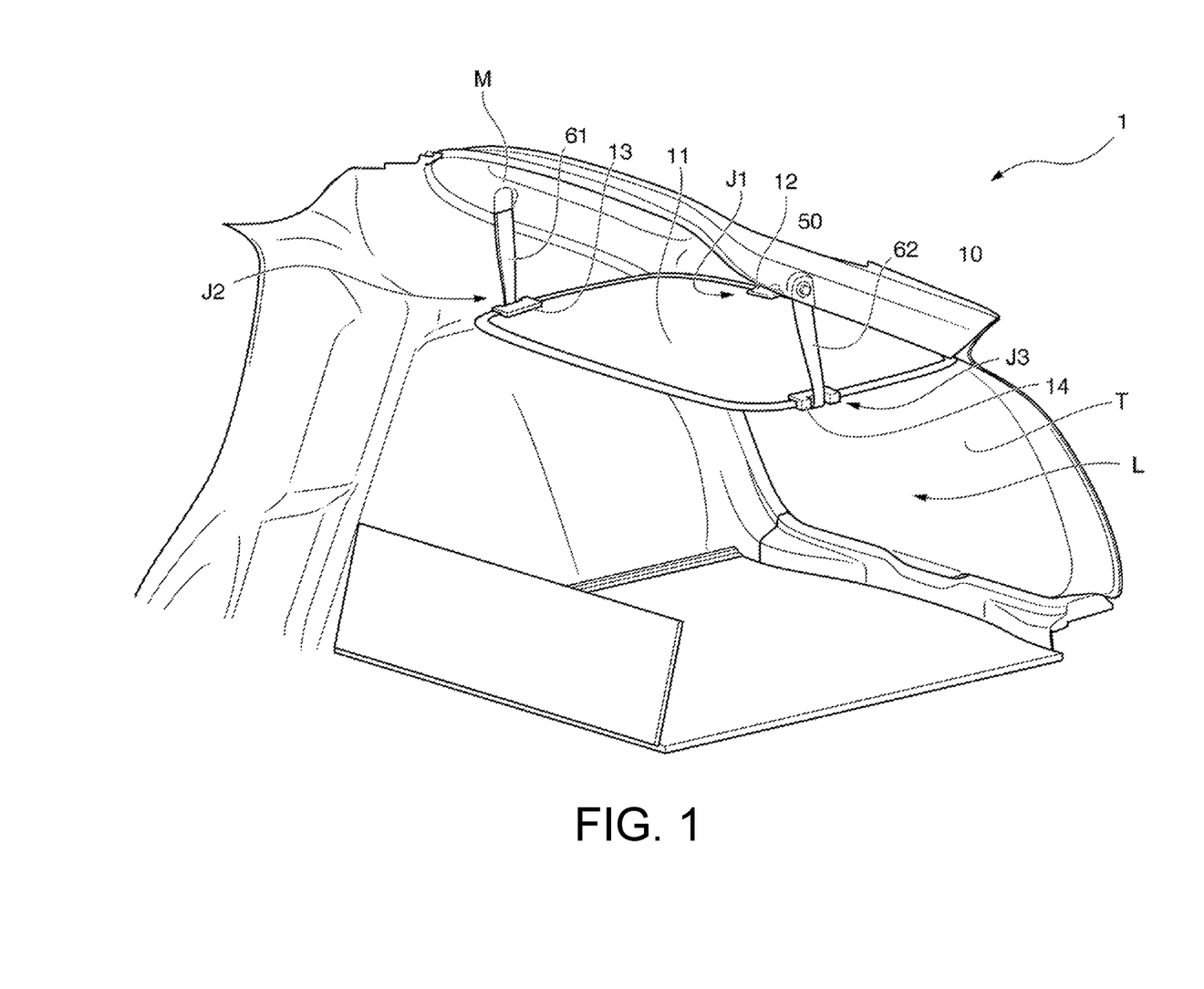
FIG. 1 is a perspective view of a main part of a vehicle M including a vehicle tonneau cover 1 of an embodiment.

FIG. 1 is a perspective view of a main part of a vehicle M including a tonneau cover device 1 of an embodiment. The tonneau cover device 1 provided in the vehicle M includes, for example, a tonneau cover unit 10, a tailgate bracket 50, a right suspension portion 61, and a left suspension portion 62. In the following description, the traveling direction of the vehicle M is defined as the front side, and the front, rear, up, down, left, and right are defined corresponding to the definition of the front side. Further, unless otherwise specified, the description will be made with reference to a state in which a tailgate T, which is a part of the vehicle body of the vehicle M, is closed.

The tonneau cover unit 10 includes, for example, a tonneau cover 11, a tonneau cover bracket 12, a right front bracket 13, and a left front bracket 14. The tonneau cover 11 is attached to the tailgate T of the vehicle M by respectively connecting the tonneau cover bracket 12 and the tailgate bracket 50, the right front bracket 13 and the right suspension portion 61, and the left front bracket 14 and the left suspension portion 62. A luggage compartment L is provided below the tonneau cover 11. The tonneau cover 11 is a plate-shaped member that covers the upper portion of the luggage compartment L.

The tonneau cover bracket 12 is mounted on a rear end edge (rear end portion) of the tonneau cover 11 at the rear portion of the vehicle M. The right front bracket 13 is located at the rear side of the vehicle M, but is on the front side of the installation position of the tonneau cover bracket 12 and mounted on the right edge of the tonneau cover 11. The left front bracket 14 is mounted on a left edge side of the tonneau cover 11 at the same position as the right front bracket 13 in the front-rear direction. The tonneau cover bracket 12, the right front bracket 13, and the left front bracket 14 are all made of, for example, resin.

Figure 2:
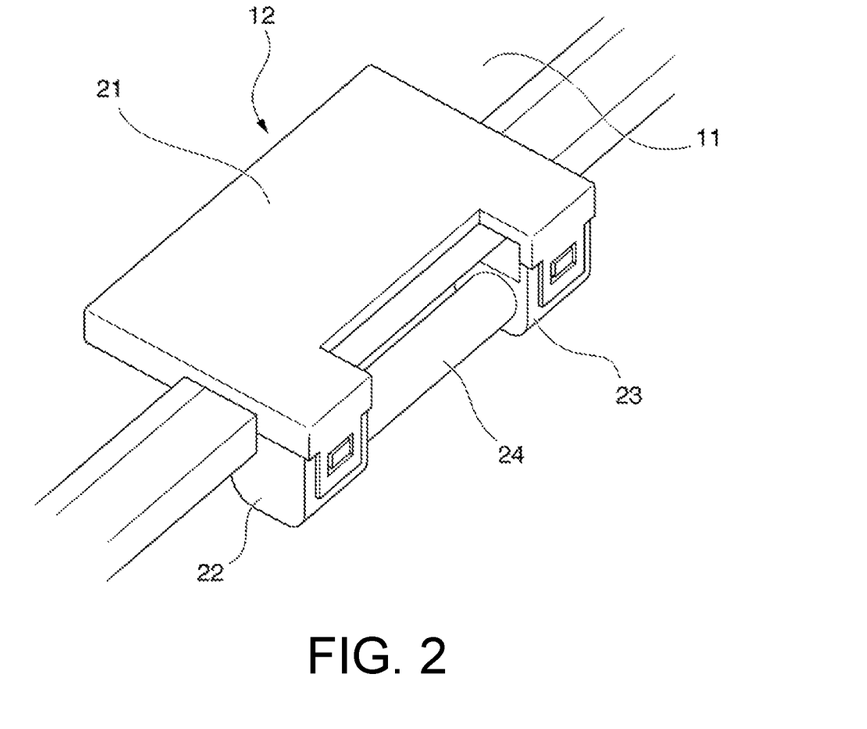
FIG. 2 is a perspective view of a tonneau cover bracket 12 as viewed from the upper rear side.
Figure 3:
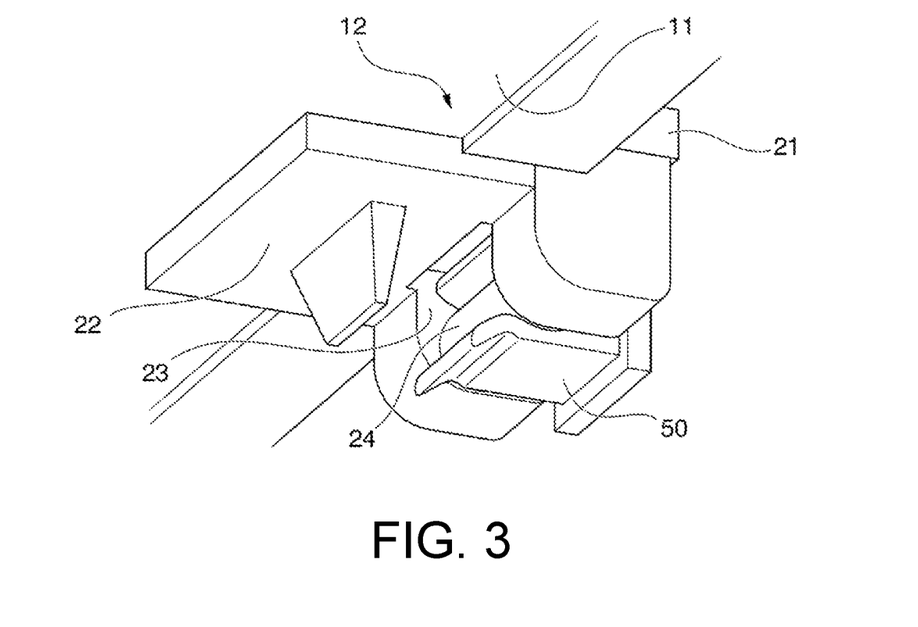
FIG. 3 is a perspective view of a tonneau cover bracket 12 as viewed from the lower front side.
Figure 4:
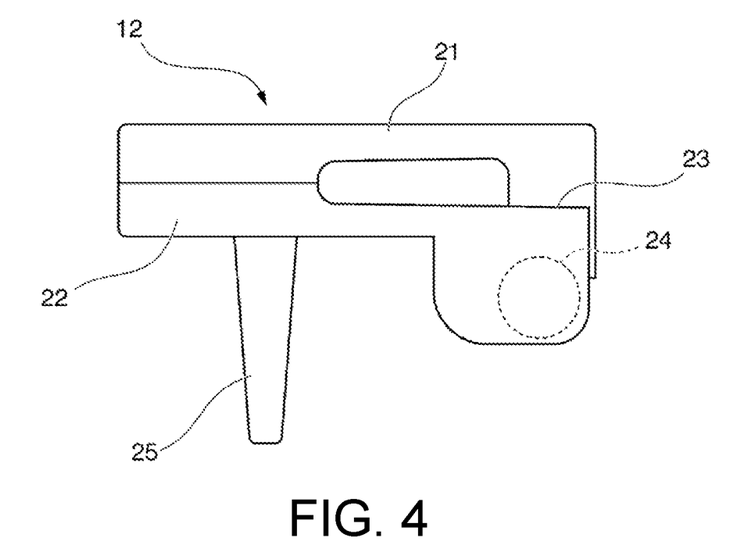
FIG. 4 is a side view of the tonneau cover bracket 12.

FIG. 2 is a perspective view of a tonneau cover bracket 12 as viewed from the upper rear side, FIG. 3 is a perspective view of a tonneau cover bracket 12 as viewed from the lower front side, and FIG. 4 is a side view of the tonneau cover bracket 12. The tonneau cover bracket 12 includes a tonneau cover bracket upper portion 21 and a tonneau cover bracket lower portion 22. The tonneau cover bracket upper portion 21 and the tonneau cover bracket lower portion 22 are connected to each other via a hinge portion 23.

The tonneau cover bracket 12 is mounted on the tonneau cover 11 by sandwiching the tonneau cover 11 from above and below between the tonneau cover bracket upper portion 21 and the tonneau cover bracket lower portion 22 to hold the tonneau cover 11. The hinge portion 23 is arranged along a rear end side of the tonneau cover 11. The hinge portion 23 is provided with a lock mechanism (not shown). The lock mechanism locks the hinge portion 23 of the tonneau cover bracket 12 in a state where the tonneau cover 11 is sandwiched between the tonneau cover bracket upper portion 21 and the tonneau cover bracket lower portion 22.

A columnar portion 24 is provided behind the tonneau cover bracket lower portion 22. The columnar portion 24 has, for example, a cylindrical shape and extends in the vehicle width direction (left-right direction, parallel to the axle). The cross section of the columnar portion 24 may be other than a circle, and may be, for example, a polygon (regular polygon), an ellipse, an oval, or the like.

A handle portion 25 is provided in front of the columnar portion 24 of the tonneau cover bracket lower portion 22. The handle portion 25 is a plate-shaped member extending downward from a lower surface of the tonneau cover bracket lower portion 22. A height of the handle portion 25 is longer than a diameter (height) of the columnar portion 24. The handle portion 25 extends until a lower end portion thereof is lower than a lowest position of the columnar portion 24.

Figure 5:
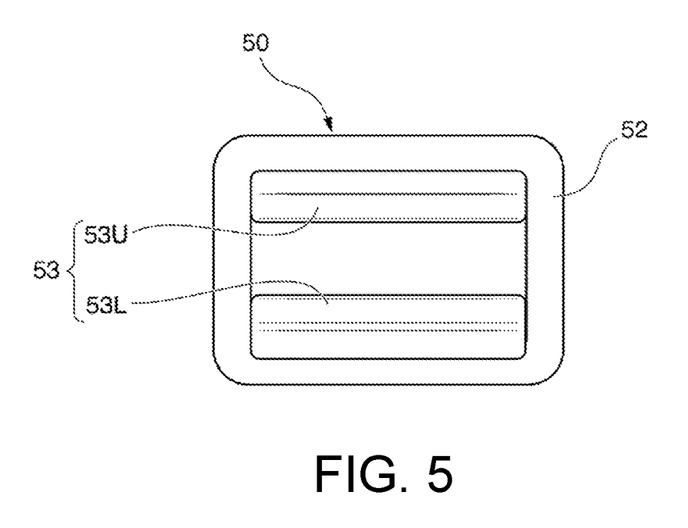
FIG. 5 is a front view of a tailgate bracket 50.
Figure 6:
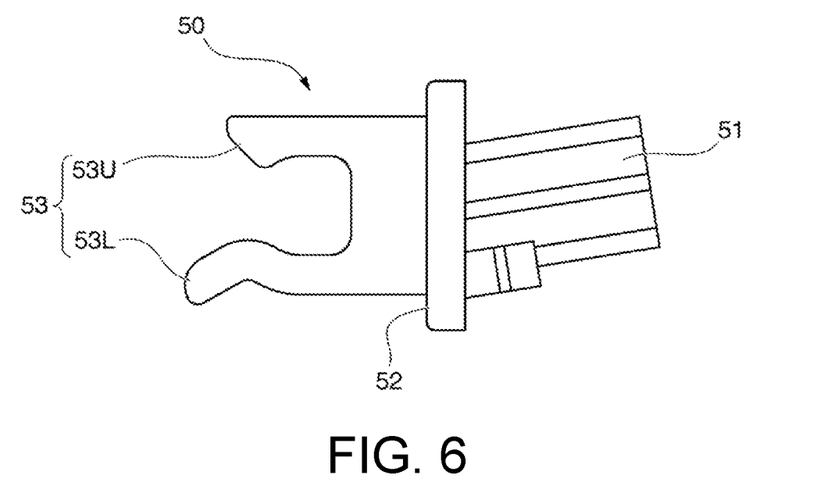
FIG. 6 is a side view of the tailgate bracket 50.
Figure 7:
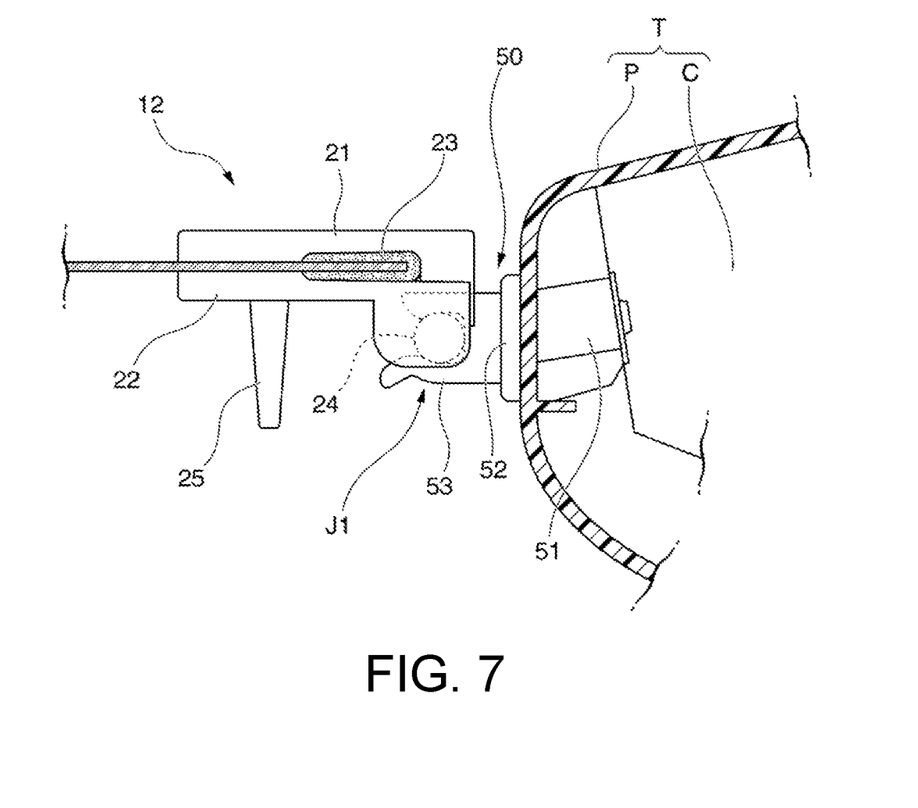
FIG. 7 is a side sectional view showing a state in which the tailgate bracket 50 is fixed to a tailgate T.

The columnar portion 24 is gripped by the tailgate bracket 50. Here, the tailgate bracket 50 will be described. The tailgate bracket 50 is fixed to the tailgate T of the vehicle M. FIG. 5 is a front view of the tailgate bracket 50, FIG. 6 is a side view of the tailgate bracket 50, and FIG. 7 is a side sectional view showing a state in which the tailgate bracket 50 is fixed to the tailgate T.

The tailgate bracket 50 includes, for example, a link portion 51, an intermediate plate 52, and a gripping claw 53. The tailgate bracket 50 is made of metal, for example. The link portion 51 is a rod-shaped member fixed to a cross member C provided inside the tailgate T. The tailgate T includes an inner panel P and the cross member C. The inner panel P is made of, for example, resin, and the cross member C is made of, for example, metal.

The link portion 51 connects the gripping claw 53 and the tailgate T of the vehicle M. The link portion 51 is provided penetrating the inner panel P, one end of the link portion 51 is fixed to the cross member C, and the intermediate plate 52 is connected to the other end of the link portion 51. The link portion 51 is inclined descending toward the front side.

The intermediate plate 52 is a plate-shaped member extending in a substantially vertical direction. The intermediate plate is arranged along a surface of the inner panel P. The link portion 51 is connected to one surface (rear surface) side of the intermediate plate 52. The gripping claw 53 is fixed to one surface (front surface) on an opposite side of the intermediate plate 52.

The gripping claw 53 includes an upper claw 53U and a lower claw 53L. There is an opening between the upper claw 53U and the lower claw 53L. The lower claw 53L of the gripping claw 53 is longer than the upper claw 53U. The gripping claw 53 is made of, for example, an elastic resin. The space between the upper claw 53U and the lower claw 53L can be expanded by applying an expanding force. The upper claw 53U and the lower claw 53L return to the positions before being expanded by elasticity by being released from the expanding force.

The upper claw 53U is convexly curved from its base end toward the tip, but the tip of the upper claw 53U is directed upward. The lower claw 53L is concavely curved from its base end toward the tip, but the tip of the lower claw 53L is directed downward. The tips of the upper claw 53U and the lower claw 53L are directed away from the lower claw 53L and the upper claw 53U, respectively. Therefore, the columnar portion 24 of the tonneau cover bracket 12 may be pushed in from the front side of the gripping claw 53 and easily inserted into the gripping claw 53. The shape of the tip portion of the lower claw 53L includes a shape that is convex toward the upper claw 53U. The portion of the lower claw 53L is formed in a cross-sectional curve shape in which at least a portion of convex shape (hereinafter referred to as a "convex shape portion") is a cross-sectional curve. Therefore, the columnar portion 24 of the tonneau cover bracket 12 can be easily guided to the inside of the gripping claw 53. A tip side further away from the convex shape portion of the lower claw 53L is formed in substantially the same thickness. Therefore, the lower claw 53L is easily deformed, and the gripping claw 53L is easily opened. Both the convex shape portion of the lower claw 53L and the tip side further away from the convex shape portion are formed in a fine concave-convex shape. Therefore, the columnar portion 24 becomes easily entangled with the lower claw 53L. According to these forms, it is easier to push the columnar portion 24 of the tonneau cover bracket 12 into the gripping claw 53.

The upper claw 53U and the lower claw 53L of the gripping claw 53 extend in a common direction with each other. The direction in which the upper claw 53U and the lower claw 53L extend (the direction in which the gripping claw 53 opens) is approximately a horizontal direction. On the other hand, the direction in which the link portion 51 extends is inclined in such a way that it becomes lower toward the front side. The direction in which the link portion 51 extends is a direction that becomes higher toward the rear side as compared to the direction in which the upper claw 53U and the lower claw 53L extend.

The tonneau cover bracket 12 is held by the tailgate T by gripping the columnar portion 24 by the gripping claw 53. Since the columnar portion 24 is gripped by the gripping claw 53 while tonneau cover bracket 12 is mounted on the tonneau cover 11, the tonneau cover 11 is connected to the tailgate T via the tonneau cover bracket 12. The tonneau cover 11 to which the tonneau cover bracket 12 is attached is rotatable (swinging) around the columnar portion 24 of the tonneau cover bracket 12 as a rotation axis. The columnar portion 24 of the tonneau cover bracket 12 and the tailgate bracket 50 form a first connection portion J1.

Figure 8:
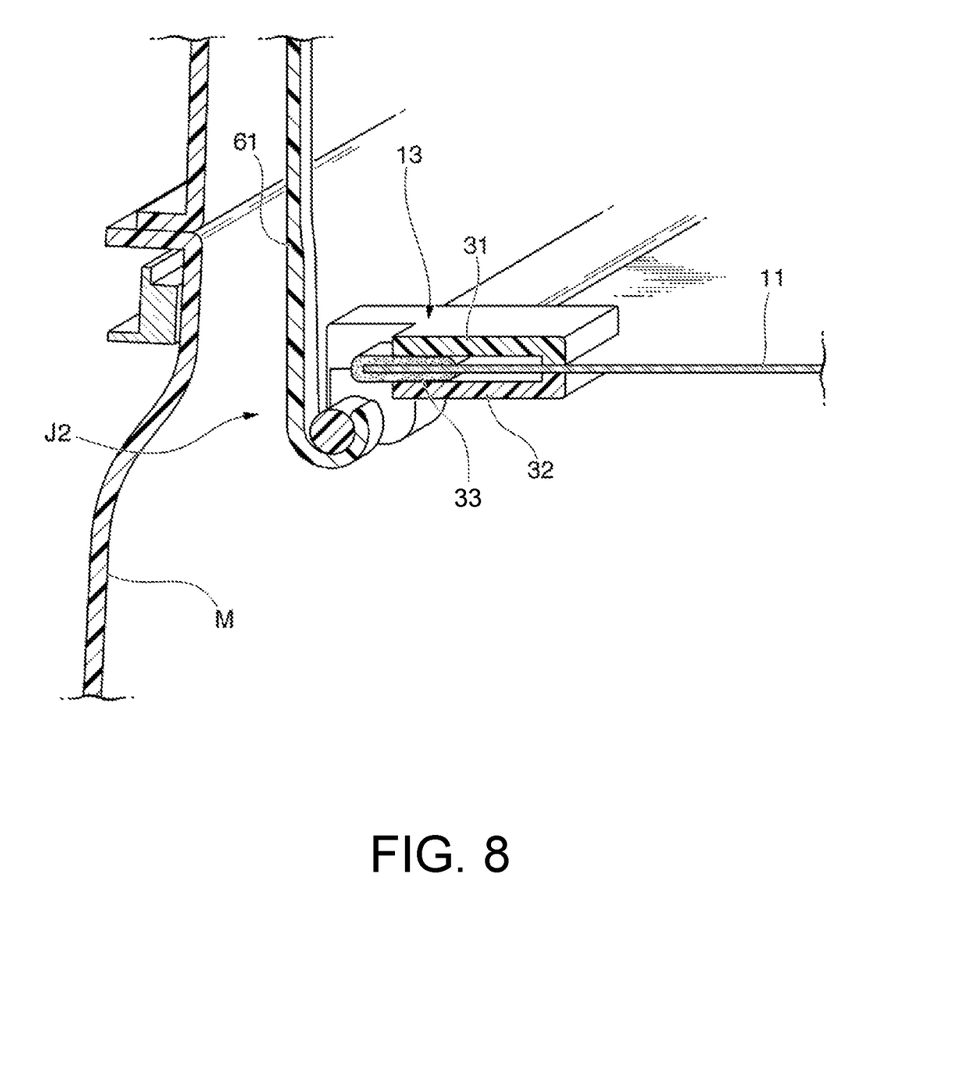
FIG. 8 is a perspective view of a right front bracket 13.

FIG. 8 is a perspective view of the right front bracket 13. The right front bracket 13 includes, for example, a right front bracket upper portion 31, a right front bracket lower portion 32, and a hinge portion 33. The left front bracket 14 has a symmetrical shape with the right front bracket 13. The left suspension portion 62 has a symmetrical shape with the right suspension portion 61. In the following, the right front bracket 13 and the right suspension portion 61 will be mainly described, and detailed description of the left front bracket 14 and the left suspension portion 62 will be omitted.

The right front bracket 13 is mounted on the tonneau cover 11 by sandwiching the tonneau cover 11 from above and below between the right front bracket upper portion 31 and the right front bracket lower portion 32 to hold the tonneau cover 11. The hinge portion 33 is arranged along a left end side of the tonneau cover 11. The hinge portion 33 is provided with a lock mechanism (not shown). The lock mechanism locks the hinge portion 33 of the right front bracket 13 in a state where the tonneau cover 11 is sandwiched between the right front bracket upper portion 31 and the right front bracket lower portion 32.

A fitting groove (not shown) is provided on a bottom surface of the right side portion of the right front bracket lower portion 32. The fitting groove is a groove into which the lower end portion of the right suspension portion 61 is fitted. The right suspension portion 61 is suspended from the tailgate T. The right suspension portion 61 extends in the vertical direction. The right suspension portion 61 is made of, for example, a resin having a constant shape.

The lower end portion of the right suspension portion 61 is a hook portion having a hook shape that is folded upward. The hook portion of the right suspension portion 61 is fitted into the fitting groove, and the right front bracket 13 is suspended by the right suspension portion 61. With the right front bracket 13 suspended by the right suspension portion 61, the tonneau cover 11 is connected to the tailgate T via the right front bracket 13. The right front bracket 13 and the right suspension portion 61 form a second connection portion J2.

The left front bracket 14 and the left suspension portion 62 have the same relationship as the right front bracket 13 and the right suspension portion 61. With the left front bracket 14 suspended by the left suspension portion 62, the tonneau cover 11 is connected to the tailgate T via the left front bracket 14. The left front bracket 14 and the left suspension portion 62 form a third connection portion J3. The tonneau cover 11 is suspended by the right suspension portion 61 and the left suspension portion 62.

Figure 9:
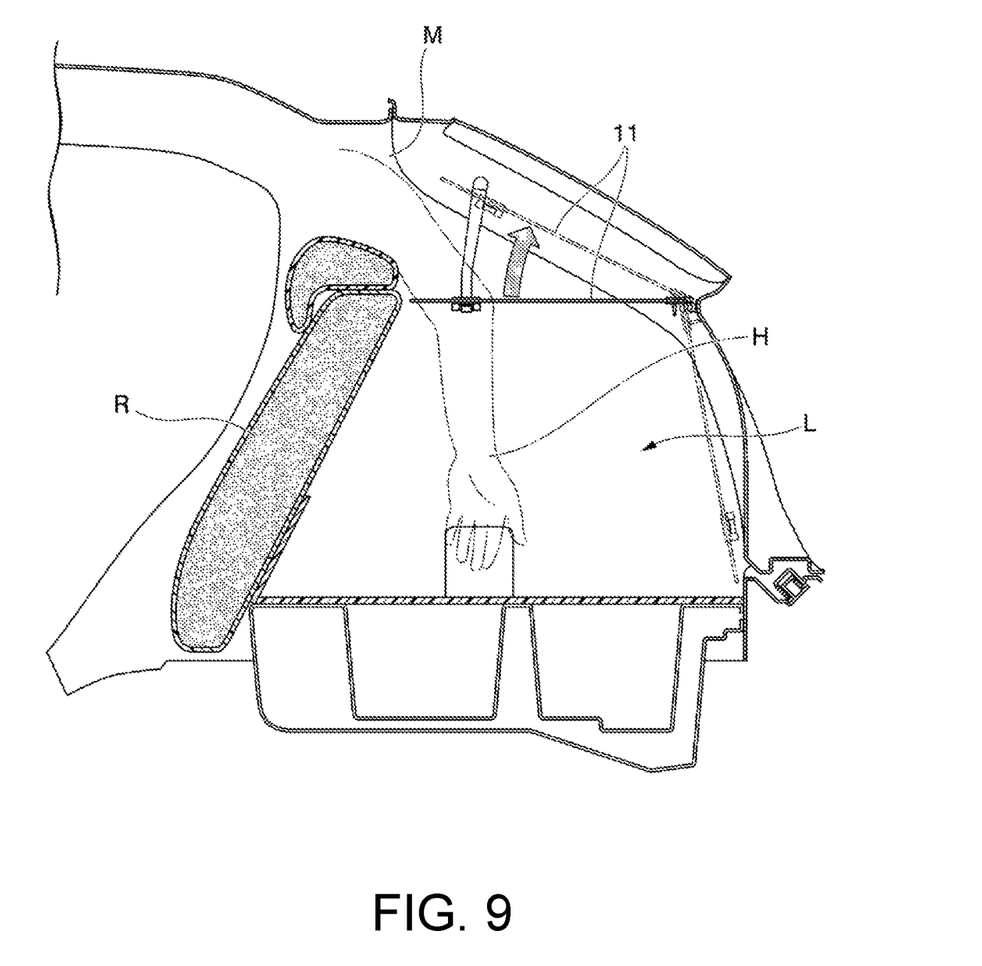
FIG. 9 is a view showing a state of taking out a luggage in a luggage compartment L from a rear seat R.

The right suspension portion 61 and the left suspension portion 62 are arranged at positions immediately behind a rear seat in the vehicle M, and a front end side of the tonneau cover 11 reaches a position near a back surface of a rear seat R (see FIG. 9). Therefore, most or all of the luggage compartment L is covered with the tonneau cover 11.

In the tonneau cover device 1 of the embodiment, the columnar portion 24 of the tonneau cover bracket 12 is gripped by the gripping claw 53 of the tailgate bracket 50. The tonneau cover 11 is rotatable around the columnar portion 24 as a rotation axis while the tailgate T of the vehicle M is mounted. The right front bracket 13 has the fitting groove placed at the tip portion of the right suspension portion 61, and the left front bracket 14 has the fitting groove placed at the tip portion of the left suspension portion 62. Therefore, by pushing up the front portion of the tonneau cover 11 from below, the fitting of the right suspension portion 61 and the left suspension portion 62 and the fitting groove can be easily removed. Therefore, by pushing up the front portion of the tonneau cover 11, the tonneau cover 11 rotates around the columnar portion 24 as a rotation axis, so the operator, for example, the occupant can open the tonneau cover 11 to expose the inside of the luggage compartment L.

In the tonneau cover device 1 of the embodiment, when the tailgate T is opened, the tonneau cover device 1 also moves with the movement of the tailgate T, and the luggage compartment L opens. The tonneau cover 11 is attached to the tailgate T by gripping the columnar portion 24 on the gripping claw 53 of the tailgate bracket 50. Therefore, the tonneau cover 11 can be removed from the tailgate T by pulling out the columnar portion 24 from the gripping claw 53 while the tailgate T is open. Since the gripping claw 53 has elasticity and can be easily expanded, the columnar portion 24 can be easily pulled out from the gripping claw 53 by moving the tonneau cover 11 in the direction of pulling it away from the tailgate T.

The tonneau cover 11 is connected to the tailgate T via the tonneau cover bracket 12 and the tailgate bracket 50, the right front bracket 13 and the right suspension portion 61, and the left front bracket 14 and the left suspension portion 62. The tonneau cover 11 becomes independent from the vehicle M by disconnecting the tonneau cover bracket 12 and the tailgate bracket 50, the right front bracket 13 and the right suspension portion 61, and the left front bracket 14 and the left suspension portion 62. Therefore, the tonneau cover 11 can be made independent from the vehicle M. The vehicle M can be provided with a storage unit for storing the independent tonneau cover 11.

Here, in the tonneau cover device 1 of the embodiment, the columnar portion 24 is arranged below the tonneau cover 11 when the tailgate T is closed. Therefore, since the handle portion 25 is provided at a position close to the connection portion provided with the columnar portion 24 and the tailgate bracket 50, the force when the handle portion 25 is operated can be efficiently transmitted to the connection portion. Therefore, the occupant can smoothly remove the tonneau cover 11 from the tailgate T, and the removed tonneau cover 11 can be smoothly attached to the tailgate T.

Further, in the tonneau cover device 1 of the embodiment, the tonneau cover bracket 12 is provided with the handle portion 25 extending from the tonneau cover bracket lower portion 22. The handle portion 25 extends downward from the tonneau cover bracket lower portion 22 while the tailgate T is closed. Therefore, when the tailgate T is opened, it can be operated such that the occupant can easily move it away from the tailgate T. Therefore, the occupant can smoothly remove the tonneau cover 11 from the tailgate T, and the removed tonneau cover 11 can be smoothly attached to the tailgate T.

Further, in the tonneau cover device 1 of the embodiment, the shape of the tip portion of the lower claw 53L includes a shape that is convex toward the upper claw 53U. Therefore, the occupant can smoothly remove the tonneau cover 11 from the tailgate T, and the removed tonneau cover 11 can be smoothly attached to the tailgate T. Moreover, the direction in which the link portion 51 of the tailgate bracket 50 extends is a direction that becomes higher toward the rear side as compared to the direction in which the upper claw 53U and the lower claw 53L extend. Therefore, the tonneau cover 11 can be attached and detached more smoothly.

Further, in the tonneau cover device 1 of the embodiment, the right suspension portion 61 and the left suspension portion 62 are arranged at positions immediately behind the rear seat of the vehicle M, and the front end side of the tonneau cover 11 reaches a position near the back cover of the rear seat. Therefore, as shown in FIG. 9, an occupant H seated on the rear seat R can open the luggage compartment L by lifting the front end edge of the tonneau cover 11 by hand and releasing the suspension of the tonneau cover 11. The occupant H who has opened the luggage compartment L can, for example, pick up an item in the luggage compartment L by hand. The right front bracket 13 and the left front bracket 14 that connect the tonneau cover 11 and the vehicle M are placed on the right suspension portion 61 and the left suspension portion 62, respectively. Therefore, the suspension of the tonneau cover 11 can be easily released, and the tonneau cover 11 can be easily lifted to open the luggage compartment L.

In the tonneau cover device 1 of the above embodiment, the tonneau cover 11 and the tailgate T are connected via three brackets: the tonneau cover bracket 12, the right front bracket 13, and the left front bracket 14, but may be connected via one bracket. Alternatively, the tonneau cover 11 and the tailgate T may be connected via two or four or more brackets. In the tonneau cover device 1 of the above embodiment, there is one tonneau cover bracket 12 that is mounted on the rear end edge of the tonneau cover 11, but there may be two or more. In the tonneau cover device 1 of the above embodiment, the tonneau cover bracket 12, the right front bracket 13, and the left front bracket 14 all include an upper portion and a lower portion, but they may be integrally formed. In this case, each bracket may be attached to the tonneau cover 11 as non-removable.

(2): According to aspect (1), further included is a tailgate bracket provided at a tailgate of the vehicle and to which the columnar portion is attached, in which the tailgate bracket includes a gripping claw having an upper claw and a lower claw to grip the columnar portion, in which the lower claw is longer than the upper claw, and a shape of a tip portion of the lower claw includes a shape that is convex toward the upper claw.

(3): According to aspect (1), further included is a tailgate bracket provided at a tailgate of the vehicle and to which the columnar portion is attached, in which the tailgate bracket includes a gripping claw having an upper claw and a lower claw to grip the columnar portion, and a link portion linking the gripping claw and the tailgate of the vehicle, in which the upper claw and the lower claw extend in a common direction with each other, and a direction in which the link portion extends is a direction that becomes higher towards the rear side compared to a direction in which the upper claw and the lower claw extend.

(4): According to any one of aspects (1) to (3), the tonneau cover is connected to the tailgate of the vehicle by one or more connection portions, and one of the connection portions includes the columnar portion and the tailgate bracket provided at the tailgate and to which the columnar portion is attached.

(5): According to aspect (4), the tonneau cover becomes independent of the vehicle when the tonneau cover and the tailgate are disconnected from each other at all of the one or more connection portions.

(6): According to any one of aspects (1) to (5), the columnar portion is arranged below the tonneau cover when the tailgate of the vehicle is closed.

(7): According to any one of aspects (1) to (6), a lower end portion of the handle portion is arranged below the columnar portion when the tailgate of the vehicle is closed.

(8): According to any one of aspects (1) to (7), the tonneau cover bracket includes a tonneau cover bracket upper portion and a tonneau cover bracket lower portion connected via a hinge portion, and the tonneau cover bracket is mounted on the tonneau cover by holding a rear portion of the tonneau cover with the tonneau cover bracket upper portion and the tonneau cover bracket lower portion.

According to (1) to (8), the tonneau cover can be completely removed from the vehicle body, and the mounting and dismounting operations can be smoothly performed.

Although the embodiments for carrying out the disclosure have been described above using the embodiments, the disclosure is not limited thereto, and various modifications and substitutions can be made without departing from the gist of the disclosure.

What is claimed is:

1. A tonneau cover device comprising:
   a tonneau cover installed on a rear portion of a vehicle, and
   a tonneau cover bracket mounted on a rear end portion of the tonneau cover, wherein
   the tonneau cover bracket comprises a columnar portion extending in a vehicle width direction and serving as a rotation axis of the tonneau cover, and a handle portion arranged in front of the columnar portion and extending downward.

2. The tonneau cover device according to claim 1, further comprising:
   a tailgate bracket provided at a tailgate of the vehicle and to which the columnar portion is attached, wherein
   the tailgate bracket comprises a gripping claw having an upper claw and a lower claw to grip the columnar portion, wherein
   the lower claw is longer than the upper claw, and a shape of a tip portion of the lower claw comprises a shape that is convex toward the upper claw.

3. The tonneau cover device according to claim 1, further comprising:
   a tailgate bracket provided at a tailgate of the vehicle and to which the columnar portion is attached, wherein
   the tailgate bracket comprises a gripping claw having an upper claw and a lower claw to grip the columnar portion, and a link portion linking the gripping claw and the tailgate of the vehicle, wherein
   the upper claw and the lower claw extend in a common direction with each other, and a direction in which the link portion extends is a direction that becomes higher towards the rear side compared to a direction in which the upper claw and the lower claw extend.

4. The tonneau cover device according to claim 1, wherein the tonneau cover is connected to the tailgate of the vehicle by one or more connection portions, and one of the connection portions comprises the columnar portion, and the tailgate bracket provided at the tailgate and to which the columnar portion is attached.

5. The tonneau cover device according to claim 4, wherein the tonneau cover becomes independent of the vehicle when the tonneau cover and the tailgate are disconnected from each other at all of the one or more connection portions.

6. The tonneau cover device according to claim 1, wherein the columnar portion is arranged below the tonneau cover when the tailgate of the vehicle is closed.

7. The tonneau cover device according to claim 1, wherein a lower end portion of the handle portion is arranged below the columnar portion when the tailgate of the vehicle is closed.

8. The tonneau cover device according to claim 1, wherein the tonneau cover bracket comprises a tonneau cover bracket upper portion and a tonneau cover bracket lower portion connected via a hinge portion, and the tonneau cover bracket is mounted on the tonneau cover by holding a rear portion of the tonneau cover with the tonneau cover bracket upper portion and the tonneau cover bracket lower portion.

* * * * *